(12) United States Patent
Laine

(10) Patent No.: US 10,561,992 B2
(45) Date of Patent: Feb. 18, 2020

(54) POROUS MEMBRANE AND METHOD OF PRODUCTION THEREOF

(71) Applicant: HURRAH SARL, Kehlen (LU)

(72) Inventor: Carole Laine, Attert (BE)

(73) Assignee: HURRAH SARL, Kehlen (LU)

( * ) Notice: Subject to any disclaimer, the term of this patent is extended or adjusted under 35 U.S.C. 154(b) by 0 days.

(21) Appl. No.: 16/065,671

(22) PCT Filed: Dec. 14, 2016

(86) PCT No.: PCT/EP2016/081003
§ 371 (c)(1),
(2) Date: Jul. 29, 2018

(87) PCT Pub. No.: WO2017/108534
PCT Pub. Date: Jun. 29, 2017

(65) Prior Publication Data
US 2018/0369760 A1   Dec. 27, 2018

(30) Foreign Application Priority Data

Dec. 24, 2015   (LU) .......................................... 92934

(51) Int. Cl.
| | |
|---|---|
| *B01D 69/14* | (2006.01) |
| *B01D 69/06* | (2006.01) |
| *B01D 71/30* | (2006.01) |
| *B01D 69/02* | (2006.01) |

(52) U.S. Cl.
CPC ........... *B01D 69/148* (2013.01); *B01D 69/02* (2013.01); *B01D 69/06* (2013.01); *B01D 71/30* (2013.01); *B01D 2325/06* (2013.01)

(58) Field of Classification Search
CPC .... B01D 69/10; B01D 69/141; B01D 69/148; B01D 2323/21; B01D 2325/02; B01D 71/28; B01D 61/147; B01D 69/02; B01D 71/027
See application file for complete search history.

(56) References Cited

U.S. PATENT DOCUMENTS

| | | | | |
|---|---|---|---|---|
| 3,351,495 A | * | 11/1967 | Larsen | ................ H01M 2/1653 |
| | | | | 210/500.36 |
| 3,450,650 A | * | 6/1969 | Murata | ................ B29C 67/202 |
| | | | | 106/122 |
| 3,696,061 A | | 10/1972 | Selsor et al. | |

(Continued)

FOREIGN PATENT DOCUMENTS

EP         2902094         8/2015

OTHER PUBLICATIONS

E.J. Arlman, Thermal and Oxidative Decomposition of Polyvinyl Chloride, Journal of Polymer Science, vol. XII, pp. 547-558 (1954).

(Continued)

*Primary Examiner* — Ana M Fortuna
(74) *Attorney, Agent, or Firm* — James Creighton Wray

(57) ABSTRACT

The invention provides a porous membrane comprising polyvinyl chloride (PVC) and at least one inorganic filler embedded in the porous membrane wherein the inorganic filler comprises sulfuric acid precipitated silica. The invention further provides a process for the production of said porous membrane.

15 Claims, 1 Drawing Sheet

(56) References Cited

U.S. PATENT DOCUMENTS

| | | | | |
|---|---|---|---|---|
| 3,751,536 A | * | 8/1973 | Bourat | B01D 61/145 |
| | | | | 264/45.8 |
| 3,862,030 A | * | 1/1975 | Goldberg | B01D 17/10 |
| | | | | 210/767 |
| 4,237,083 A | * | 12/1980 | Young | B01D 39/083 |
| | | | | 264/179 |
| 4,681,750 A | | 7/1987 | Johnson et al. | |
| 5,615,024 A | * | 3/1997 | May | G02F 1/133621 |
| | | | | 349/158 |
| 7,211,322 B2 | | 4/2007 | Pekala | |
| 2003/0022068 A1 | | 1/2003 | Pekala | |
| 2003/0224245 A1 | * | 12/2003 | Miller | H01M 2/14 |
| | | | | 429/143 |
| 2004/0058142 A1 | | 3/2004 | Pekala | |
| 2010/0092757 A1 | * | 4/2010 | Nair | B01D 65/003 |
| | | | | 428/306.6 |
| 2010/0269882 A1 | * | 10/2010 | Stanley | H02S 20/23 |
| | | | | 136/244 |
| 2013/0228529 A1 | * | 9/2013 | Guo | C08K 3/34 |
| | | | | 210/767 |
| 2014/0069862 A1 | * | 3/2014 | Guo | B01D 67/002 |
| | | | | 210/500.29 |

OTHER PUBLICATIONS

Ibtisam M. Kamal, et al., The Effect of Molecular Weight on the Thermal Stability of Polyvinyl Chloride, Thermochinica Acta., vol. 62, pp. 355-359 (1983).

M.T. Taghizadeh, et al., The Study of the Thermal Stability of Poly (Vinyl-Chloride) with Different Molecular Weight, JSUT vol. 33, pp. 25-32 (2007).

International Preliminary Report on Patentability for PCT/EP2016/081003, International Searching Authority, dated Mar. 23, 2018.

* cited by examiner

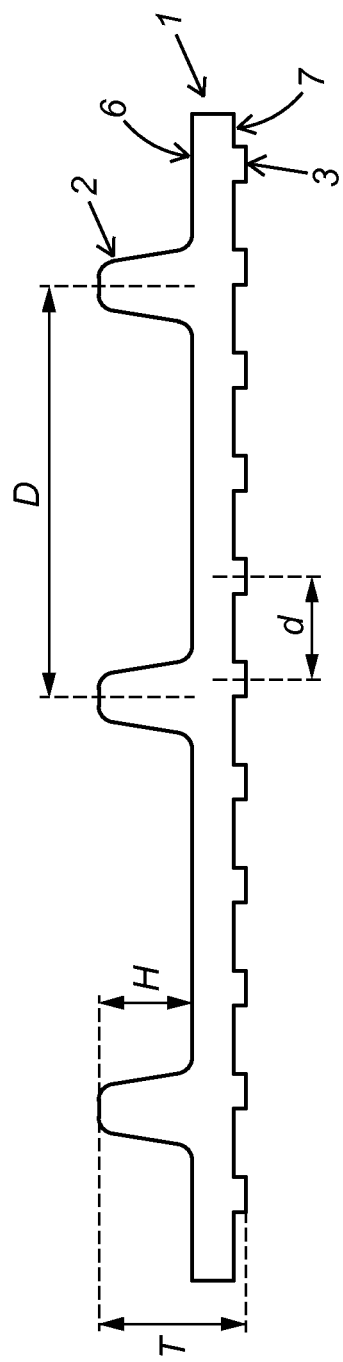
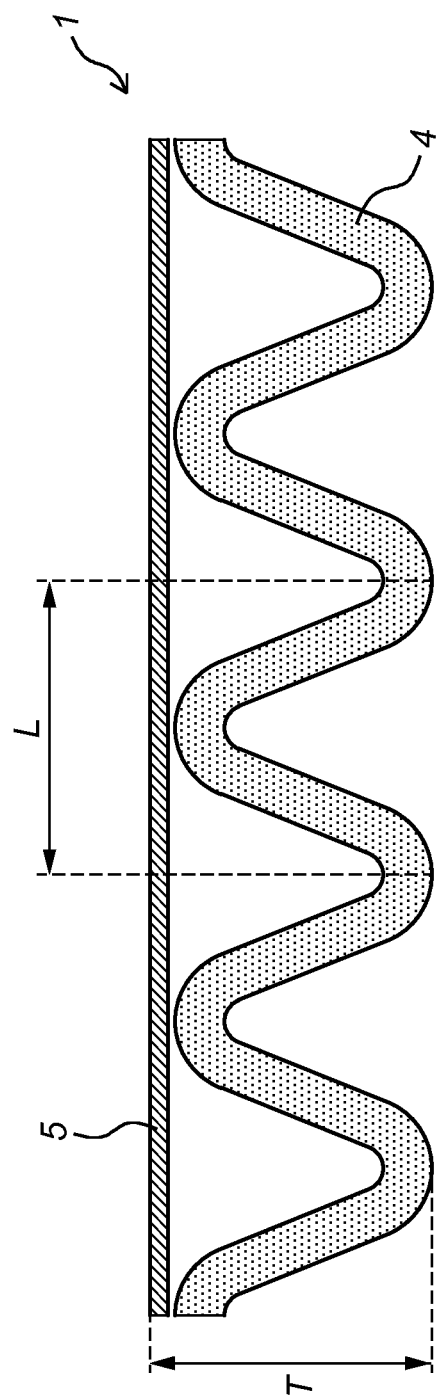

POROUS MEMBRANE AND METHOD OF PRODUCTION THEREOF

FIELD OF THE INVENTION

The present invention relates to a porous membrane, in particular porous membranes, and method of production thereof.

BACKGROUND

Porous membranes are widely used for a variety of applications depending on their properties such as the material used for making said membranes, their morphology and the size of the membrane pores. Said membranes can be used as filtration membranes, separation membranes, membrane adsorbers, membrane catalysts or membrane bioreactors. The fields of application include nanotechnology, food science, energy, environment, health, chemicals, biotechnologies and medicine.

In general, porous membranes are obtained by sintering organic or inorganic materials or by track-etching process. Porous membrane can also be prepared by stretching polymer films. These films are extruded from a polymer powder at high temperatures of from 100 to 250° C. which are close to melting temperature as described in U.S. 60/293,301 and U.S. Pat. No. 3,351,495A. The extruded films are then annealed, cooled and stretched. Matrix membranes are very often prepared by sol-gel method to synthetize silica particle in-situ within polymer solution, followed by phase separation. One of the drawbacks of these procedures is the use of considerable solvent volumes. Said solvents are not recoverable which is detrimental for the workers, the environment but also increases the costs of said membranes.

Porous membranes of the prior art are generally single use membranes. To re-use a membrane, it should be washed under acid and/or oxidative conditions to ensure elimination of all molecules and/or residues from a previous use. Membranes known to date show severe loss of integrity when washed under acid and/or oxidative conditions.

Given the wide use of porous membranes, membranes with specific surface properties, functionalized with specific ligands, increased robustness, able to resist to solvents and/or to various cleaning agents and/or able to endure extreme pH conditions are strongly required. There is also a need for washable and reusable membranes.

The object of the invention is to overcome at least part of the above mentioned problems. One of the aims of the invention is to provide reusable porous membranes where specific functionalities can be added easily. Another object is to provide membranes having long-term resistant to extremely acidic and oxidative conditions and/or to a large variety of solvents. Another object is to provide a process for the production of porous membranes which is economical and environment-friendly. These objects are achieved in accordance with the invention as described in the claims.

SUMMARY

In a first aspect, the present invention provides membrane comprising polyvinyl chloride (PVC) and at least one inorganic filler embedded in the porous membrane wherein the inorganic filler comprises sulfuric acid precipitated silica. Preferably, the viscosity of the PVC is at least Kwert=60. Said viscosity is measured according to ISO 1628-2. The PVC is selected from the group comprising suspension PVC, micro-suspension PVC and emulsion PVC.

In a second aspect, the invention provides a method for manufacturing a porous membrane comprising:
- formation of a powder blend comprising a thermoplastic polymer material and at least one inorganic filler having pores;
- addition of a first solvent so that the first solvent is absorbed in the pores of the inorganic filler, said first solvent is chosen from the group of ketones such as cyclohexanone or methyl ethyl ketone or diacetone alcohol, and mixtures thereof;
- addition of a second solvent so as to displace the first solvent from the pores of the inorganic filler, said second solvent is water;
- extruding and/or calendaring said powder thereby obtaining a raw membrane;
- liquid phase extraction of the solvents in order to form a porous membrane; and
- optional deformation of at least one surface of the membrane so as to obtain a corrugated or ribbed membrane;

wherein the inorganic filler comprises sulfuric acid precipitated silica. Preferably, the thermoplastic polymer material is polyvinyl chloride having a viscosity of at least 60 measured according to ISO 1628-2.

In a preferred embodiment, the extrusion step is carried out at a temperature of from 25° C. to 50° C. The calendaring step is preferably performed at room temperature thereby simplifying production process of the membrane and considerably reducing production costs.

The membrane according to an embodiment of the invention has a high oxidation resistance allowing it to withstand washing and cleaning under very acid and/or oxidative condition. Under said conditions, the membrane does not loose integrity. This makes it possible to reuse the same membrane several times for variable purposes.

The membrane can also be used in aggressive environment, especially low pH such as concentrated sulfuric acid (for example $H_2SO_4$ at d=1.28), phosphoric acid (for example $H_3PO_4$ at d=1.25), mixture of hydrogen peroxide and sulfuric acid (so called Piranha solution). The membrane is compatible with solvents such as alcohols, aliphatic hydrocarbon, acids, oils and bleach.

The membrane of the invention shows high mechanical resistance and high thermal stability compared to the membranes of the prior art.

BRIEF DESCRIPTION OF THE FIGURES

FIG. 1 shows an embodiment of the membrane wherein the upper surface and the lower surface comprise ribs.

FIG. 2 shows an embodiment of a corrugated membrane.

DETAILED DESCRIPTION

The present invention relates to a porous membrane, in particular porous membranes, and method of production thereof.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings: "A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints. The expression "at maximum–number" includes all numbers and fractions from 0 to said number, as well as the recited number.

The expression "% by weight" (weight percent), here and throughout the description unless otherwise defined, refers to the relative weight of the respective component based on the overall weight of the formulation.

In a first aspect, the present invention provides a porous membrane PVC and at least one inorganic filler embedded in the porous membrane wherein the inorganic filler comprises sulfuric acid precipitated silica. Preferably, the inorganic filler consists of sulfuric acid precipitated silica particles. The use of sulfuric acid precipitated silica provides a hydrophilic membrane and prevents addition of wetting agents which is source of leachables. Preferably, the membrane of the invention is devoid of oils and/or plasticizers thereby improving oxidation resistance of the membrane and minimizing or having no leachable amounts.

The inorganic filler may have pores. Preferably, the PVC viscosity of at least 60 measured according to ISO 1628-2.

The membrane is preferably made of a powder blend comprising a thermoplastic polymer material and at least one inorganic filler embedded in the porous membrane. Said thermoplastic polymer material is preferably polyvinyl chloride having a viscosity of at least 60 measured according to ISO 1628-2. The inorganic filler preferably consists of sulfuric acid precipitated silica particles. The powder blend viscosity is at least 200 m.g., preferably at least 260 m.g., more preferably at least 270 m.g., even more preferably at least 280 m.g. and most preferably at least 290 m.g. Said viscosity is at most 350 m.g., preferably at most 340 m.g., more preferably at most 330 m.g., even more preferably at most 320 m.g., most preferably at most 310 m.g. even most preferably at most 300 m.g. Viscosity of the powder blend can be any value comprised between the aforementioned values. Said viscosity provides good consistency to the powder blend and allows extrusion and/or calendaring of the powder at room temperature. Our experiments showed that blends having viscosity lower than 200 m.g. or higher than 350 m.g. cannot be extruded and/or calendared at room temperature. Viscosity is measured for the powder blend in molten state using a Brabender rheometer operating at a temperature of 40° C. with a rotational speed of its rotors equal to 40 revolutions per minute.

The viscosity of the polyvinyl chloride is at least 61, preferably at least 62, more preferably at least 63, most preferably at least 64. Said viscosity is at most 70, preferably at most 69, more preferably at most 68, most preferably at most 67. Viscosity of the PVC is preferably around 65. Viscosity is measured according to ISO 1628-2 and can be comprised between any of the aforementioned values.

Preferably, the plasticizer absorption of the PVC as determined by ISO 4608 is of from 20% to 30%, preferably of from 22% to 28%, more preferably of from 24% to 26%.

In a preferred embodiment, the inorganic filler represents between 0.7 and 2.5 times the weight of the thermoplastic polymer.

The membrane is devoid of hydrochloric acid precipitated silica. This is advantageous as the membrane will have low metallic impurities, in particular low free chloride content. Preferably, the membrane free chloride content is at maximum 180 ppm, preferably at maximum 100 ppm, more preferably at maximum 70 ppm, most preferably at maximum 60 ppm. Free chloride content is measured via standard argentometric titration after calcination of the membrane at 700° C. during 8 hours and dissolution of the residue in hydrofluoric acid. This provides oxidation resistance to the membrane. Additionally catalytic effect of PVC degradation is absent in the membranes according to the invention. Consequently, the membrane can be washed under very acid and/or oxidative conditions without loss of integrity.

The thermal stability of the membrane is preferably at least 30 min, preferably at least 40 min, more preferably at least 40 min. The thermal stability is measured according to DIN 53381 part 1.

Membranes according to an embodiment of the invention have been tested for weight loss (%) in oxidative solution containing potassium dichromate, hot sulfuric acid or hydrogen peroxide. Membranes available on the market have also been tested. The results are provided in table 1 wherein membranes according to the invention are referred to by example 1 and 2 and membranes available on the market are referred to by control 1 and 2. Control 1 and control 2 are membranes made of cross-linked phenolic resin and devoid of PVC.

TABLE 1 weight loss in % of different membranes in various oxidative solutions

| Membrane | Thickness in mm | potassium dichromate | hot sulfuric acid | hydrogen peroxide |
|---|---|---|---|---|
| Example 1 | 3.43 | 2.1 | 2.2 | 5.1 |
| Example 2 | 3.43 | 2.2 | 2.1 | 5.0 |
| Control 1 | 3.51 | 18.3 | 5.4 | 92.2 |
| Control 2 | 3.25 | 15.7 | 3.8 | 92.3 |

Table 1 clearly shows that the membranes of the invention are more resistant to oxidative solution compared to membranes of the prior art. Without being restrictive, the improved resistance to oxidative solutions is due to the composition of the membrane of the invention, more in particular to the presence of PVC having a viscosity of at least 60 as described above.

Membranes according to the invention have high oxidation resistance and show minor weight loss compared to the membranes available on the market. Said high oxidation resistance allows washing the membrane of the invention under acid and/or oxidative condition with minor loss of integrity. This is advantageous as the membranes can be reused after washing for example with (i) acid cleaners and/or solution for removal of inorganic fouling and deposits (ii) oxidizers for removal of organic foulants such as proteins and pectin (iii) oxidants such as free chlorine (NaOCl) for removal of hydrophilic foulants.

The membranes of the invention present high mechanical resistance. Said mechanical resistance is measured by the percentage of thickness loss of membranes heated for 10 min at a temperature of at least 65° C. The membranes of the invention showed reduced thickness loss compared to membranes of the prior art which were similarly heated for 10 min at 65, 70 and 75° C. Without being restrictive, the high mechanical resistance of the membranes of the invention is due to their composition, in particular to the presence of PVC, more in particular to the presence of PVC having a viscosity of at least 60. The improved mechanical resistance is particularly pronounced for corrugated membranes. Indeed, corrugated membranes according to the invention showed minor thickness loss compared to corrugated membranes of the prior art.

The membranes of the invention present high thermal resistance. Said thermal resistance is measured by determining the time after which the membrane degrades at a given temperature. The time after which membranes of the invention degraded at a given temperature was always longer than the time at which membranes of the prior art degraded at the same temperature. Without being restrictive, the high thermal resistance of the membranes of the invention is due to their composition, in particular to the presence of PVC, more in particular to the presence of PVC having a viscosity of at least 60.

The composition of the membranes of the invention, resulting in improved resistance to oxidation, temperature and mechanical stress, allows reduction of the membrane's backweb thickness without altering the membrane's properties. This is advantageous compared to the membranes of the prior art for which reduction of the backweb thickness translates into alteration of the membrane's properties such as reduced resistance to oxidative solutions. This is shown in Table 2 below reporting results of tests conducted on weight loss (%) of membranes having different backweb thickness in oxidative solutions. The oxidative solutions and the control membranes 1 and 2 are similar to those of table 1. The membranes according to the invention are referred to by examples 1 to 4.

TABLE 2 weight loss in % of membranes having different backweb thickness in various oxidative solutions

| Membrane | Backweb thickness in mm | Total thickness in mm | potassium dichromate | hot sulfuric acid | hydrogen peroxide |
|---|---|---|---|---|---|
| Example 1 | 0.35 | 3.43 | 2.1 | 2.2 | 5.1 |
| Example 2 | 0.40 | 1.88 | 1.6 | 1.8 | 1.0 |
| Example 3 | 0.50 | 1.88 | 1.8 | 1.8 | 5.2 |
| Example 4 | 0.54 | 3.43 | 2.2 | 2.1 | 5.0 |
| Control 1 | 0.34 | 3.51 | 18.3 | 5.4 | 92.2 |
| Control 2 | 0.49 | 3.25 | 15.7 | 3.8 | 92.3 |

Table 2 shows that membranes of the invention present high resistance to oxidative solutions compared to the membranes of the prior art. The improved resistance is irrespective of backweb thickness of the membrane of the invention (example 1 versus 4 and example 2 versus 3). This is not the case for the membranes of the prior art for which the resistance to oxidative solutions varies according to the backweb thickness (control 1 versus control 2).

Preferably, the membrane solvent content is at maximum 0.5% by weight and has an extractible content of less than 1% in total weight after extraction in hexane and/or in methanol. The solvent content is measured by gas chromatography after complete dissolution in Dimethylformamide. These properties of the membrane are advantageous as oil and/or solvents are prevented from leaching out of the membrane. The extractible content of membranes available on the market is more than 3% in total weight after extraction in hexane and methanol. The extractible content of membranes according to an embodiment of the invention is less than 0.5% after extraction in methanol and 0.5% after extraction in hexane.

Preferably, the membrane water content is at maximum 4% by weight. The water content is measured using a standard scale for humidity known to the person skilled in the art.

The membrane has a porosity of at least 60%, preferably at least 65%, more preferably at least 68%, even more preferably at least 70%, most preferably 75%.

Preferably the minimum pore size of the membrane's pores is of from 0.3 to 1.5 μm, the mean flow pore size (MFP) is 1 to 3 μm and the bubble point or the maximum pore size is at most 10 μm. Pore size of is measured by capillary flow porometer.

The membrane might be flat meaning that both the upper surface and the lower surface are devoid of deformations. The membrane might also be formed into a ribbed and/or a corrugated form. The deformations, i.e. ribs or corrugations, can be located on one face or both faces of the membrane. In the case of deformations on both faces, the deformations can face each other or can be shifted from each other. Corrugated and/or ribbed membranes provide a significant functional surface increase when the membrane is functionalized. The surface increases up to two fold compared with the flat membranes. In addition, ribs provide an integrated spacer to the membrane. This avoids the use of extra means such as plastic grids to have spacers on the membrane.

The ribs on each surface of the membrane might have variable or constant heights. The distance separating two consecutive ribs on one surface of the membrane might be variable or constant. The distance separating two consecutive ribs on the upper surface might be similar or different compared to the distance separating two consecutive ribs on the lower surface of the membrane. Preferably, the distance separating two consecutive ribs on one surface of the membrane is of from 0.5 to 15 mm, preferably from 1 to 13 mm, more preferably from 3 to 12 mm.

The membrane might be monomodal corrugated membrane having a pore size between 0.3 and 10 μm or bimodal corrugated membrane comprising a first group of pores having a diameter of at maximum 0.3 μm, preferably at maximum 0.31 μm, most preferably at maximum 0.35 μm and a second group of larger pores having a diameter between 1 and 10 μm.

The membrane might be monomodal ribbed membrane having a pore size between 0.3 and 10 μm or bimodal corrugated membrane comprising a first group of pores having a diameter of at maximum 0.3 μm, preferably at maximum 0.31 μm, most preferably at maximum 0.35 μm and a second group of larger pores having a diameter between 1 and 10 μm.

The values given to pore size are average pore size. It is to be understood that the pore size depends on the intended application of the membrane. Said pore size can therefore be adjusted according to intended use of the membrane. Adjustment of the pore size of the membrane is known to the person skilled in the art. The pore size can be adjusted during the fabrication and/or after the fabrication using post treatment method.

The overall thickness of the membrane is between 0.2 and 1.5 mm, preferably between 0.3 and 1.2 mm, more preferably between 0.4 and 1 mm, most preferably between 0.5 and 0.9 mm. The thickness of the membrane can be any values comprised between the aforementioned ranges. The overall thickness of the membrane can also be of from 0.2 to 5 mm, preferably of from 0.8 to 1.8 mm.

FIG. 1 shows an embodiment of a membrane according to the invention. The membrane 1 comprises an upper surface 6 and a lower surface 7. Each of said surfaces comprises ribs 2, 3. The distance D between the ribs 2 of the upper surface is of from 3 to 12 mm. The distanced between the ribs 3 of the lower surface is of from 1.7 to 12 mm. The height H of the ribs 2 of the upper surface but also the height of the ribs 3 of the lower surface is variable. The thickness T of the membrane is of from 0.3 mm to 5 mm. The ribs dimensions mentioned above provide enhanced spacer functionality to the membrane but also good flux and limited fouling thickness impact permeability.

FIG. 2 shows an embodiment of a membrane according to the invention. The membrane 1 comprises an optional cover layer 5 and multiple corrugations 4. The length L of one corrugation is of from 4 to 6 mm. The thickness T of the membrane, excluding the optional cover layer 5, is of from 0.3 mm to 5 mm.

The membrane is preferably a "self-supporting membrane", which means that the membrane supports its own weight, it is able to hold firm without support and does not collapse on itself. It means for instance a membrane which can be bent but not folded unlike a paper sheet like membrane. This term does hence not exclude flexible membranes to the extent that they meet such definition. The membrane, as it is self-supporting, withstands high pressures of from 40 psi to 60 psi, preferably from 45 psi to 58 psi, more preferably about 56 psi. The membrane according to the invention is also resistant to the measures usually taken to limit fouling, such as the backwashing. It enables long-term operation without the need for frequent intensive cleaning. Moreover, it is easy to assemble into modules.

In a second aspect, the present invention provides a method for manufacturing a porous membrane comprising:
formation of a powder blend comprising PVC and at least one inorganic filler having pores;
addition of a first solvent so that the first solvent is absorbed in the pores of the inorganic filler, said first solvent is chosen from the group consisting of cyclohexanone, methyl ethyl ketone, tetrahydrofuran, methyl acetate and mixtures thereof;
addition of a second solvent so as to displace the first solvent from the pores of the inorganic filler, said second solvent is water thereby allowing to form the blend as a freely flowing wet powder which can be extruded and calendared;
extruding and/or calendaring said powder thereby obtaining a raw membrane;
liquid phase extraction of the solvents in order to form a porous membrane; and
optional deformation of at least one surface of the membrane so as to obtain a corrugated or ribbed membrane;
wherein the thermoplastic polymer material is polyvinyl chloride having a viscosity of at least 60 measured according to ISO 1628-2 and the inorganic filler comprises sulfuric acid precipitated silica.

Preferably, the powder blend is formed by introducing PVC, the inorganic filler which is silica and additives into a blender. All components are originally in solid form and are being mixed for 5 min at room temperature in said blender.

Preferably, the first solvent temperature is about 30° C. and the second solvent temperature is about 45° C. In a preferred embodiment, the first solvent consists of cyclohexanone. The process of the invention is environment friendly as cyclohexanone is soluble in the extraction solvent, i.e. water, thereby providing for the recovery of said cyclohexanone. The recovery can be carried out using standard distillation technologies.

Preferably, the first solvent is added in form of spray at a flow of at least 10 kg/min, preferably at least 11 kg/min and of at most 13 kg/min over 20 min. The second solvent is also added in form of spray at a flow of at least 9 kg/min, preferably at least 10 kg/min and of at most 12 kg/min over 20 min. After a final mixing step at room temperature for about 5 min, the blend viscosity is measured to ensure having appropriate viscosity for further steps.

The powder blend viscosity is at least 250 m.g., preferably at least 255 m.g., more preferably at least 260 m.g., most preferably at least 265 m.g. Said viscosity is at most 290 m.g., preferably at most 285 m.g., more preferably at most 280 m.g. and most preferably at most 275 m.g. Viscosity of the powder blend can be any value comprised between the aforementioned values. Viscosity is measured as described above.

Preferably, the first solvent is added in a proportion that is less than the saturation level of the polymer/filler blend. This proportion of first solvent that may be added to the blend depends on several factors, especially on the polymer, on the filler, on its amount and its absorptivity. It also depends on factors that are associated with the type of blender used and with the speed and temperature during the blending. The total amount of the first solvent is chosen so that it is substantially entirely absorbed by the filler under the chosen operating conditions.

If the proportion of the first solvent is too high, local paste formation occurs due to the polymer being dissolved locally by the first solvent. To optimize the incorporation of the first solvent, it is preferred to add it in the form of a mist over a period of about 20 minutes or longer.

After incorporation of the first solvent, the second solvent is added to the blend. The second solvent is preferably also added in the form of a mist and will be absorbed by the filler.

In a preferred embodiment, the extrusion step is carried out at a temperature of from 25° C. to 50° C., preferably from 30° C. to 45° C., more preferably about 45° C. The calendaring step is preferably performed at room temperature thereby simplifying production process of the membrane and considerably reducing production costs. By room temperature reference is made to temperatures of from 16° C. to 25° C., preferably from 17° C. to 24° C., more preferably 18° C. to 23° C., even more preferably 19° C. to 22° C., most preferably from 20° C. to 21° C. or any value comprised in between the aforementioned ranges and values. Calendar rolls might be cooled down with water having a temperature of about 15° C.

After the raw membrane has been formed, it is transferred into the extraction medium under conditions such that the amount of the first and second solvent that evaporates before its immersion in the extraction medium is minimized. The membrane can be immediately transferred to the extraction medium after the extrusion step.

The temperature of the liquid phase extraction is maintained about 5° C. to 20° C. above the temperature in the formation of the raw membrane. Preferably, the extraction is carried out by passing the raw membrane through a liquid bath which temperature is of from 15° C. to 85° C., preferably of from 20° C. to 80° C., more preferably of from 25° C. to 75° C. or any value comprised in between the aforementioned ranges. The residence time in the water bath is of from 2 min to 30 min, preferably of from 5 min to 25 min, more preferably of from 10 min to 20 min. Said residence time allows improved solvent recovery as more time is given to the solvent to escape from the membrane. Porosity of the membrane is also improved with longer residence time in the liquid bath.

The pores in are created during this step. After extraction of the solvent(s), the membrane is dried for 2 to 10 min at a temperature of from 60 to 80° C., preferably at a temperature of about 70° C. This treatment and in particular the temperature range avoids shrinkage of the pores.

It should be noted that the temperature conditions during extraction must be closely controlled in order to obtain reproducible extraction pore formation. The temperature and other parameter conditions of the extraction bath have a major effect on the size, number and distribution of the extraction pores.

The organic solvent content of the extraction bath is preferably maintained as low as possible. The concentration of the solvent in the bath may be reduced by continuous distillation of the solvent.

The raw membrane and/or the membrane can also undergo further steps, for example to modify the pore size and/or the porosity of the membrane, like the formation of additional pores. These steps can be during the extraction and/or after the extraction using post-treatment method. Examples of additional steps are chemical and/or mechanical formation of additional pores, coating treatment or others treatments known to one skilled in the art. Mechanical formation of additional pores can include the deformation of the raw membrane and/or the membrane.

The raw membrane and/or the membrane can be deformed. The method then comprises a further deformation step of the raw membrane and/or the membrane. This step can be before and/or after the step of liquid phase extraction of the solvents mentioned above. Preferably, the deformation step is before the step of liquid phase extraction of the solvents if it comprises the formation of ribs, and it is after said step if it comprises the formation of corrugations.

The raw membrane and/or the membrane can be deformed from double-flat surfaces into either ribbed or corrugated surfaces. The deformation can be performed by goffering or by another process suitable for obtaining the membrane in the form of a sheet having ribs or corrugations. This deformation step has the beneficial effect of enhancing the membrane rigidity and of further increasing the volume porosity of the initial flat membrane. For example, a flat membrane of 79.4% volume porosity will have a volume porosity of 81.5% after having been corrugated in order to achieve a final thickness of 1.60 mm starting with a flat sheet of thickness 0.55 mm.

Although the present invention has been described with reference to preferred embodiments thereof, many modifications and alternations may be made by a person having ordinary skill in the art without departing from the scope of this invention which is defined by the appended claims.

The invention claimed is:

1. A porous membrane comprising polyvinyl chloride (PVC) and at least one inorganic filler embedded in the porous membrane, wherein the inorganic filler comprises sulfuric acid precipitated silica, wherein the viscosity of the PVC is at least 60 measured according to ISO 1628-2, wherein said porous membrane is devoid of any oils and/or plasticizers, and wherein said membrane has a porosity of at least 60% and a mean flow pore size, measured by capillary flow porometer, between 0.3 and 3 µm.

2. The membrane according to claim 1, wherein a composition of the membrane is selected from the group comprising suspension PVC, micro-suspension PVC and emulsion PVC.

3. The membrane according to claim 2, which is devoid of hydrochloric acid precipitated silica.

4. The membrane according to claim 2, wherein the composition of the membrane has a free chloride content of at maximum 180 ppm.

5. The membrane according to claim 4, wherein the composition of the membrane has a solvent content of at maximum 0.5% by weight.

6. The membrane according to any of claims 1-5, wherein the composition of the membrane has a water content of at maximum 4% by weight.

7. The membrane according to any of claims 1-5, having an upper surface and a lower surface wherein at least one of said surfaces is at least partially corrugated.

8. The membrane according to any of claims 1-5, having an upper surface and a lower surface wherein at least one of said surfaces is flat.

9. The membrane according to any of claims 1-5, wherein said membrane is made of a powder blend having a viscosity of 200 m.g. to 350 m.g., as determined using a Brabender rheometer at 40° C. and 40 rpm.

10. The membrane according to any of claims 1-5, wherein the membrane is an extruded and calendared membrane, extruded at about 25° to 50° C. and calendared at room temperature.

11. The membrane of claim 1, wherein the viscosity of the PVC material is at most 70 measured according to ISO 1628-2.

12. A method for manufacturing a porous membrane comprising:
    formation of a powder blend comprising PVC and at least one inorganic filler having pores;
    addition of a first solvent so that the first solvent is absorbed in the pores of the inorganic filler, said first solvent is chosen from the group of ketones;
    addition of a second solvent so as to displace the first solvent from the pores of the inorganic filler, said second solvent is water;
    extruding and/or calendering said powder thereby obtaining a raw membrane;
    liquid phase extraction of the solvents in order to form a porous membrane; and
    optional deformation of at least one surface of the membrane so as to obtain a corrugated or ribbed membrane;
    wherein the inorganic filler comprises sulfuric acid precipitated silica and the thermoplastic polymer material is polyvinyl chloride (PVC) wherein the viscosity of the PVC is at least 60 measured according to ISO 1628-2, wherein said porous membrane is devoid of any oils and/or plasticizers, and wherein said membrane has a porosity of at least 60% and a mean flow pore size, measured by capillary flow porometer, between 0.3 and 3 µm.

13. The method according to claim 12 wherein the PVC is selected from the group comprising suspension PVC, micro-suspension PVC and emulsion PVC.

14. The method according to claim 12 wherein the calendering step is carried out at a temperature of from 19 to 25° C.

15. The method according to any of claims 12-14, wherein the powder blend viscosity is at least 200 m.g. and at most 350 m.g.

* * * * *